US012601315B2

(12) United States Patent
Markoski et al.

(10) Patent No.: US 12,601,315 B2
(45) Date of Patent: Apr. 14, 2026

(54) CARBURETED ENGINE HAVING AN ADJUSTABLE FUEL TO AIR RATIO

(71) Applicant: INI Power Systems Inc., Morrisville, NC (US)

(72) Inventors: Larry J. Markoski, Raleigh, NC (US); Timothy C. Simmons, Durham, NC (US)

(73) Assignee: INI POWER SYSTEMS INC.

(*) Notice: Subject to any disclaimer, the term of this patent is extended or adjusted under 35 U.S.C. 154(b) by 0 days.

(21) Appl. No.: 16/411,513

(22) Filed: May 14, 2019

(65) Prior Publication Data

US 2020/0003161 A1 Jan. 2, 2020

Related U.S. Application Data

(63) Continuation of application No. 15/884,297, filed on Jan. 30, 2018, now abandoned, which is a
(Continued)

(51) Int. Cl.

| | |
|---|---|
| ***F02M 17/38*** | (2006.01) |
| ***F01P 3/02*** | (2006.01) |
| ***F01P 7/16*** | (2006.01) |
| ***F02B 63/04*** | (2006.01) |
| ***F02B 75/16*** | (2006.01) |
| ***F02M 7/12*** | (2006.01) |
| ***F02M 17/34*** | (2006.01) |
| ***F02M 35/10*** | (2006.01) |

(Continued)

(52) U.S. Cl.
CPC ............... *F02M 17/38* (2013.01); *F01P 3/02* (2013.01); *F01P 7/16* (2013.01); *F02B 63/04* (2013.01); *F02B 75/16* (2013.01); *F02M 7/12* (2013.01); *F02M 17/34* (2013.01); *F02M 35/1017* (2013.01); *F02P 13/00* (2013.01); *F02B 25/14* (2013.01)

(58) Field of Classification Search
CPC .. F02B 1/04; F02B 63/04; F02B 31/08; F02B 63/048; F02B 2031/003; F02D 35/003; F02D 35/0053
See application file for complete search history.

(56) References Cited

U.S. PATENT DOCUMENTS 4,068,472 A * 1/1978 Takata ................ F02D 41/1441 477/181
4,136,651 A * 1/1979 Hattori ................ F02D 41/1482 123/700

(Continued)

OTHER PUBLICATIONS

"Flange," Merriam-Webster.com Dictionary, Merriam-Webster, https://www.merriam-webster.com/dictionary/flange.*

(Continued)

*Primary Examiner* — Long T Tran
(74) *Attorney, Agent, or Firm* — Element IP, PLC

(57) ABSTRACT

A simple engine, comprises (1) a cylinder and a spark plug in the cylinder; (2) a carburetor, fluidly connected to the cylinder; (3) a primary air intake path, fluidly connecting atmosphere to the carburetor; (4) a carburetor bypass air intake path, fluidly connecting air to the cylinder without passing through the carburetor; and (5) a valve, along the carburetor bypass air intake path, for controlling the flow of air through the carburetor bypass air intake path.

15 Claims, 11 Drawing Sheets

Related U.S. Application Data continuation of application No. 14/493,168, filed on Sep. 22, 2014, now Pat. No. 9,909,534.

(51) Int. Cl.
*F02P 13/00* (2006.01)
*F02B 25/14* (2006.01)

(56) References Cited

U.S. PATENT DOCUMENTS

| | | | | | |
|---|---|---|---|---|---|
| 4,143,620 | A * | 3/1979 | Noguchi | F02B 43/10 | 123/588 |
| 4,167,161 | A * | 9/1979 | Nakagami | F02M 13/046 | 123/308 |
| 4,196,701 | A * | 4/1980 | Tamura | F02B 31/08 | 123/188.14 |
| 4,395,991 | A * | 8/1983 | Miyachi | F02M 25/0836 | 123/519 |
| 4,421,087 | A * | 12/1983 | Schuurman | F02M 21/0278 | 123/576 |
| 4,479,470 | A * | 10/1984 | Ishida | F02M 35/10085 | 123/308 |
| 4,714,063 | A * | 12/1987 | Oda | F02B 31/08 | 123/308 |
| 4,724,812 | A * | 2/1988 | Akagi | F02D 41/1451 | 123/585 |
| 4,726,342 | A * | 2/1988 | Diener | F02M 17/16 | 123/492 |
| 5,755,203 | A * | 5/1998 | Mastumoto | F02B 75/22 | 123/184.32 |
| 2004/0004356 | A1* | 1/2004 | Akimoto | F02B 63/04 | 290/1 B |
| 2004/0025817 | A1* | 2/2004 | Uenoyama | F02B 25/22 | 123/73 V |
| 2006/0260587 | A1* | 11/2006 | Woody | F02M 5/14 | 123/517 |
| 2007/0107693 | A1* | 5/2007 | Ohtsuji | F02D 11/04 | 123/336 |
| 2013/0168969 | A1* | 7/2013 | Markoski | F02B 63/04 | 290/40 D |
| 2017/0030298 | A1* | 2/2017 | Koenen | F02M 9/026 | |

OTHER PUBLICATIONS

"Gasket," Merriam-Webster.com Dictionary, Merriam-Webster, https://www.merriam-webster.com/dictionary/gasket.*

* cited by examiner

CARBURETED ENGINE HAVING AN ADJUSTABLE FUEL TO AIR RATIO

BACKGROUND

Generators for producing electricity are well known and have been commercially available for many years. These devices typically include an internal combustion engine. They are adapted to provide alternating current (AC) electricity, through a standard two-prong or three-prong plug receiver, at 120 or 240 volts, and at 50 to 60 Hz; also common is an additional 12 volt DC power port for charging lead acid batteries. Devices which use either gasoline-only or heavy fuels only, such as JP-8, diesel fuel, jet fuel or kerosene, are available.

Gasoline has a low-flashpoint (less than −20° C.) and high autoignition temperature (greater than 200° C.). In operation gasoline requires the proper air to fuel ratio and a spark to induce and maintain ignition. A throttle and/or fuel injector is used to meter the fuel/air mixture which is sucked into the cylinders of the engine during operation. The low flashpoint and volatility of gasoline allows, starting of the spark ignition engine at temperatures below freezing, allowing for operation over a broad range of temperatures typically between −20° C. to 55° C. In order to obtain acceptable efficiency, a compression ratio of 8:1 to 12:1 is desirable for a gasoline-only engine, which is low enough to allow for manual pull-starting of the engine and the construction of simple lightweight portable engine devices made of aluminum.

Portable gasoline generators have a simple design in order to keep them light, low cost and durable. Such devices include an engine having a carburetor for mixing air and fuel, and do not include a fuel injector. A carburetor jet controls the maximum amount of fuel present in the air-fuel mixture exiting the carburetor, and a choke is used to reduce the amount of air in the air-fuel mixture, for starting the engine. The size of the jet is selected to provide good performance at maximum power of the engine under typical conditions, such as 25° C. ambient temperature and sea level altitude. As the environment of the engine deviates from those typical conditions, the performance of the engine becomes changes, the environment deviates too much, it is not possible to properly operate the engine unless a different jet is used to increase the air-fuel ratio. For example, at altitudes above 5000 feet, most small portable gasoline generators will not operate unless a different jet is installed into the device. More sophisticated engines, such as those found in modern automobiles, use oxygen sensors and a fuel injector to increase the air in the air-fuel mixture so that the engine will operate efficiently at high altitudes and at higher than normal ambient temperatures. Therefore, in order to use a small portable generator that can be used in a variety of conditions, such as varying altitudes, it is necessary to also have available appropriate tools for opening the generator and removing the existing jet, a selection of jets varying in size, appropriate charts for selecting the correct jet for each altitude, as well as maps or an altimeter for determine the altitude where the generator will be operating. Furthermore, changing out the jet in a small portable gasoline generator is a somewhat complex operation involving opening the engine and handling parts which have been exposed to gasoline, which may not be desirable for typical consumers, especially in the locations where the generator will be used.

SUMMARY

In a first aspect, the present invention is a simple engine, comprises (1) a cylinder, and a spark plug in the cylinder; (2) a carburetor, fluidly connected to the cylinder; (3) a primary air intake path, fluidly connecting atmosphere to the carburetor; (4) a carburetor bypass air intake path, fluidly connecting air to the cylinder without passing through the carburetor, and (5) a valve, along the carburetor bypass air intake path, for controlling the flow of air through the carburetor bypass air intake path.

In a second aspect, the present invention is a generator, comprising the simple engine.

In a third aspect, the present invention is a flexible fuel generator, comprising the simple engine.

In a fourth aspect, the present invention is a method of running a simple engine, comprising supplying air and fuel to a carburetor, to produce an air fuel mixture; supplying the air-fuel mixture to a cylinder; supplying additional air to the cylinder; and igniting the fuel in the cylinder to drive the engine. The additional air does not go through the carburetor.

In a fifth aspect, the present invention is a method of generating electricity, comprising running a simple engine by the method. The simple engine is part of a generator.

In a sixth aspect, the present invention is a simple engine, comprising (i) a cylinder, and a spark plug in the cylinder; (ii) a carburetor, fluidly connected to the cylinder; (iii) a primary air intake path, fluidly connecting atmosphere to the carburetor; and (iv) a carburetor bypass. The carburetor bypass comprises (a) an inlet tube, fluidly connecting to the air; (b) a valve, fluidly connected to the inlet tube, and (c) an outlet tube, fluidly connected to the cylinder. The carburetor bypass provides air to the cylinder bypassing the carburetor.

In a seventh aspect, the present invention is a method of making a modified engine from a simple engine. The simple engine has a cylinder, a spark plug in the cylinder, a carburetor fluidly connected to the cylinder, and a primary air intake path fluidly connecting air to the carburetor. The method comprises adding a carburetor bypass to the simple engine. The carburetor bypass comprises (a) an inlet tube, fluidly connecting to the air; (b) a valve, fluidly connected to the inlet tube; and (c) an outlet tube, fluidly connected to the cylinder. The carburetor bypass provides air to the cylinder bypassing the carburetor.

Definitions

Heavy fuels, include diesel fuel, diesel 1, diesel 2, kerosene, JP-8, JP-5, F-76, DF2 aviation fuel and bio-diesel. Heavy fuels or gasoline are occasional mixed with a substantial amount of lubricant, such as oil, to form a fuel-lubricant mixture for use in two-stroke engine which do not contain a lubricant. Preferably, Heavy fuels or gasoline is not present as such fuel-lubricant mixtures.

Diesel fuel includes diesel 1, diesel 2, JP-8, JP-5, F-76, DF2 aviaion fuel and bio-diesel. Diesel fuel does not include kerosene.

Gaseous low-flashpoint fuels include hydrogen, syn gas, propane and butane.

Low-boiling point low-flashpoint fuels include diethyl ether and gasoline. These fuels have a boiling point of 15-50° C., and a flashpoint below 0° C.

Fuels include heavy fuels with high flash point and low autoignition temperatures, gaseous low-flashpoint fuels, low-boiling point low-flashpoint fuels and other high flash point and high autoignition fuels such as methanol, ethanol and isopropanol. Fuels may contain additives, for example to improve combustion or reduce emissions.

"portable gasoline generator" is a generator that has an internal combustion engine and includes a pull start and a carburetor, and uses a spark to ignite fuel in the engine, and preferably does not include a battery for starting the engine. The compression ratio used in the engine is greater than 80:1, and more preferably 8.1:1 to 12.0:1. Preferably, the engine is air-cooled, has an aluminum, cylinder or cylinders, and uses fixed spark plug ignition timing. Preferably, the engine is a 4 cycle, 50 cc engine. Examples of a portable gasoline generator include the YAMAHA Inverter EF1000iS, EF2000iS, and EF2000iSH, as well as the HONDA EU1000i; EU2000i and EB2000i.

The term "isothermal" or "isothermally" in the context of the operation of an engine means that the temperature of the cylinder(s) is maintained, substantially uniform within a desired temperature range, irrespective of engine RPM or ambient external temperature.

A "step-down gas regulator" is a gas regulator that delivers gas at a pressure of 0.5 to 1 psi, only supplies the gas under suction. Examples of such regulators are sold under the brand name "GARRETSON".

The term "engine" means the internal combustion engine, which includes at least a cylinder, a piston which moves inside the cylinder, a spark plug, a fuel-air inlet to the cylinder, an exhaust outlet from the cylinder, and a drive shaft which moves with the piston. The term "simple engine" means an engine which includes a carburetor, a fixed jet, and which does not include a fuel injector.

The term "running fuel" means a fuel used to run an engine, while the term "starting fuel" means a fuel used to start an engine.

The term "air intake path" includes both a primary air intake path and a carburetor bypass air intake path. An air intake path fluidly connects the atmosphere outside the generator to the engine, to supply air for combustion of the fuel. The "primary air intake path" is an air intake path that passes through the carburetor before entering the cylinder. The "carburetor bypass air intake path" is an air intake path that provides air to the cylinder without passing through the carburetor. The primary air intake path and the carburetor bypass air intake path my share portions of each path, for example both air intake paths may share a common intake which passes through the air filter before splitting off into separate paths.

DETAILED DESCRIPTION

Figure 1:
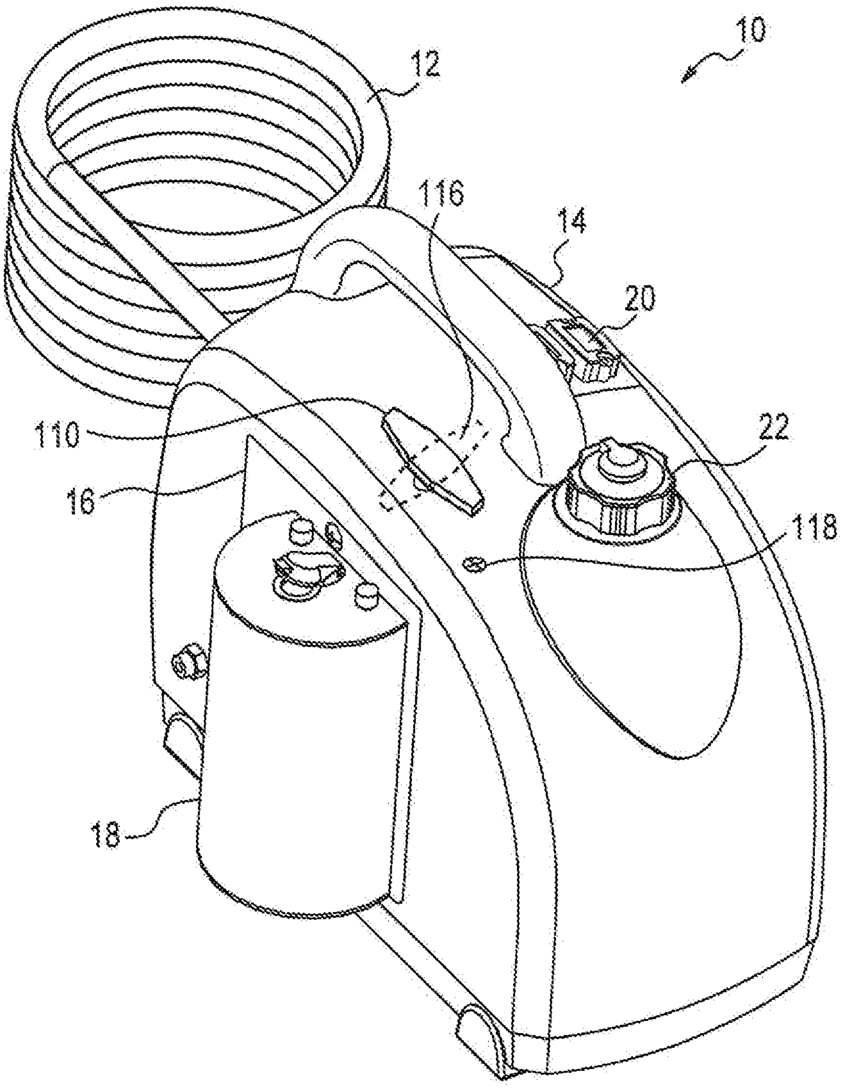
FIGS. 1 and 2 illustrate a flexible fuel generator having a simple engine including carburetor bypass air intake path.

A small portable generator which could be operated on both gasoline and heavy fuels, such as JP-8, was recently developed (hereinafter referred to as a "flexible fuel generator"); see International Application Publication No. WO 2013/103542. This generator includes a simple engine, and is similar to a small portable gasoline generator, but has been designed to operate at a temperature range of 120-180° C. The device also includes a start module which delivers a small amount of a low-boiling point low-flashpoint fuel to the carburetor via the air intake, for starting the engine. This generator is intended for use in remote, field locations, where gasoline may not be readily available. However, because this generator uses a carburetor having a jet, it cannot operate properly at high altitudes without changing the jet, as is the case with other generators having a simple engine.

The present invention is based on the discovery that inclusion of a carburetor bypass air intake path, which fluidly connects atmosphere to the cylinder and bypasses the carburetor, allows for an increase in the air-fuel ratio which enters the cylinder. This increased air-fuel ratio may be used to compensate for the reduced oxygen concentration in the atmosphere at high altitudes and/or at high ambient temperatures. With a valve along the carburetor bypass air intake path, either hand operated by the user, or automated through coupling to an oxygen sensor, an increased air-fuel ratio may be provided to the cylinder to compensate for any altitude and/or temperature encountered, without the need for the equipment and labor necessary to switch out the carburetor jet. This carburetor bypass air intake path may be included on any simple engine by adding a carburetor bypass to the simple engine. Example of devices having simple engines include generators, such as small portable generators: lawn mowers; leaf blowers; motor cycles without fuel injectors; mopeds; ATVs; and dirt bikes, Surprisingly, even though the carburetor bypass air intake path supplies air at a point after the carburetor has already prepared the air-fuel mixture, the engine operates smoothly. Even more surprising, this is true when the engine is part of a flexible fuel generator and the fuel is a heavy fuel, such as diesel fuel which is not as volatile as gasoline.

A surprising and unexpected benefit is that adjustment of the valve along the carburetor bypass air intake path may be used to dramatically improve the efficiency of a generator having a simple engine, even under condition (ambient temperature and altitude) when the generator will operate without the inclusion of the carburetor bypass. The fuel efficiency is improved about 30%, and emissions from the generator are reduced by about 30%, depending on the fuel used in the device. This level of improvement would be expected in any device containing a simple engine when a carburetor bypass air intake path is added. Furthermore, the improvement also extends to a reduction in carbon deposits in the engine, reducing maintenance such as oil changes and replacement of spark plugs. Fewer soot particles also reduces the frequency of changing the spark arrestor.

Figure 11:
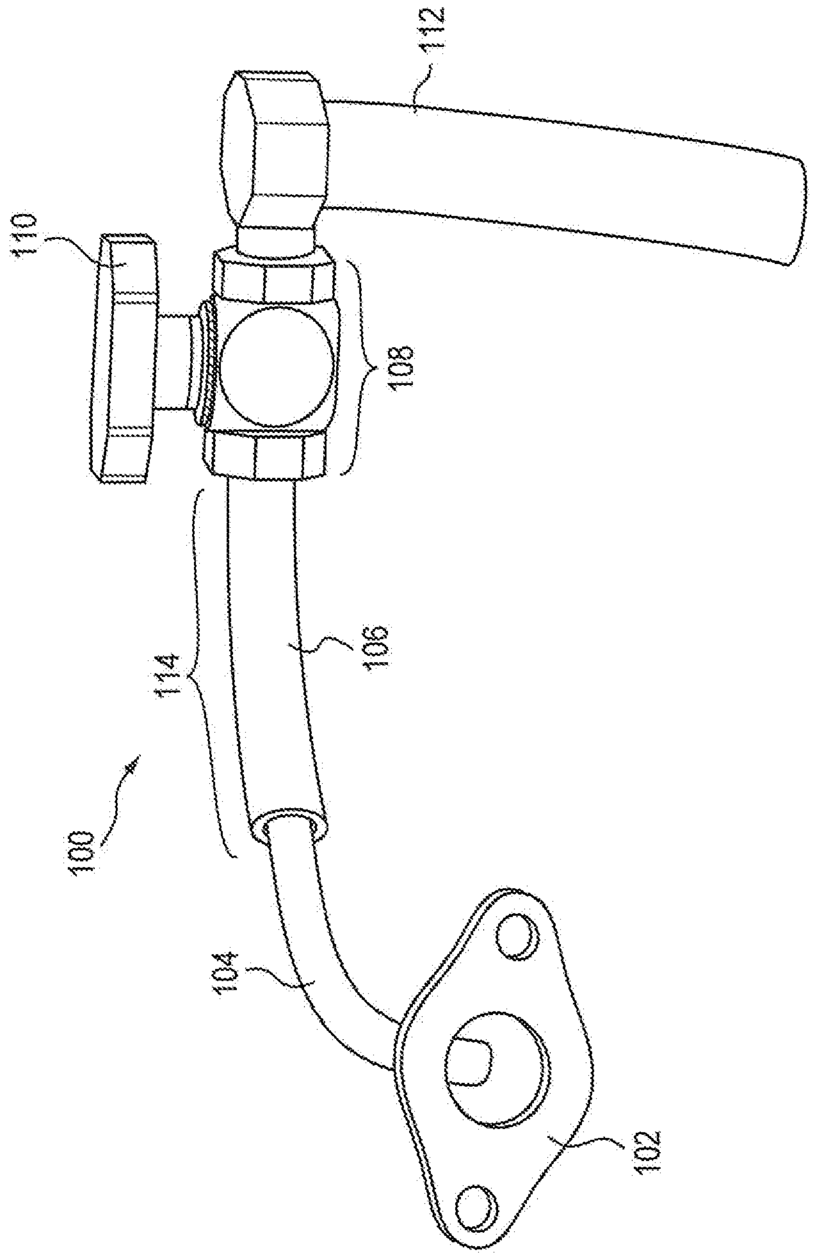
FIG. 11 illustrates a carburetor bypass.

FIG. 11 illustrates a carburetor bypass 100 for providing a carburetor bypass air intake path in a simple engine. The carburetor bypass includes an inlet tube 112, a valve 108 having a handle (110 in the open position), and an outlet tube 114. As illustrated, the outlet tube supplies air through a gasket spacer 102. The outlet tube may include multiple parts; as illustrated it includes a first tube 106, and a second tube 104 Similarly, the inlet tube may also include a first tube and a second tube. When installed into a gasoline generator, the spacer is located between the carburetor and the cylinder. The inlet tube and the outlet tube, and the parts thereof, may be made from metal or plastic, but preferably they are made of materials which will withstand the temperatures encountered in those parts of the engine. For example, the first tube may be brass, the second tube may be rubber, and the inlet tube, may be rubber. Although the gasket spacer may be a plastic material, such as a phenolic resin, preferably the spacer is metal, such as brass. Preferably, in the case of a flexible fuel generator, the gasket spacer may be brass having a thickness of ⅜ inch, the valve may be a ¼ inch ball valve, and the tube entering the gasket spacer may be brass having a 5⁄16 inch O.D. cut at a 30° angle towards the cylinder.

Inclusion of the carburetor bypass creates the carburetor bypass air intake path, defined by the carburetor bypass. Such a carburetor bypass may be used to add a carburetor bypass air intake path to any simple engine, including those of a generators, such as small portable generators (gasoline or flexible fuel); lawn mowers; leaf blowers; motor cycles without fuel injectors; mopeds; ATVs; and dirt bikes.

In use, a user may start the engine with the choke closed, then open the choke, and then adjust the valve of the carburetor bypass, starting in the closed position. While listening to the engine, the valve is slowly opened until the engine starts to sputter (for example, the movement of the piston in the cylinder becomes irregular). This indicates that the fuel is too lean (that is, the air-fuel ratio is too great). Then the valve is slowly closed until the engine runs smoothly and the sputtering stops, indicating that the air-fuel ratio has been selected for maximum efficiency. Alternatively, the movement of the valve may be automated by coupling to an oxygen sensor, using the oxygen sensor to determine when the desired air-fuel ratio has been selected for maximum efficiency, in the same fashion as, used with a fuel injector.

The inlet tube may draw air directly from outside the generator, or may draw air from an air intake path shared with the primary air intake path. Preferably, the inlet tube draws air which is filtered, for example from behind the air fitter which also filters air for the primary air intake path. If the inlet tube draws air directly from outside the generator, then some filter, constriction, or baffle may be necessary to prevent too much air from being drawn into the cylinder through the carburetor bypass.

A generator including an engine of the present application may be prepared by modifying a portable gasoline generator, such as YAMAHA Inverter EF1000iS, EF2000iS, and EF2000iSH, as well as the HONDA EU1000i, EU2000i and EB2000i, or a flexible fuel generator. In this case a carburetor bypass is used to create an carburetor bypass air intake path which draws air from behind the air filter, through the valve, and into the gasket spacer which separates the carburetor from the cylinder, by the installation of the carburetor bypass.

Figure 6:
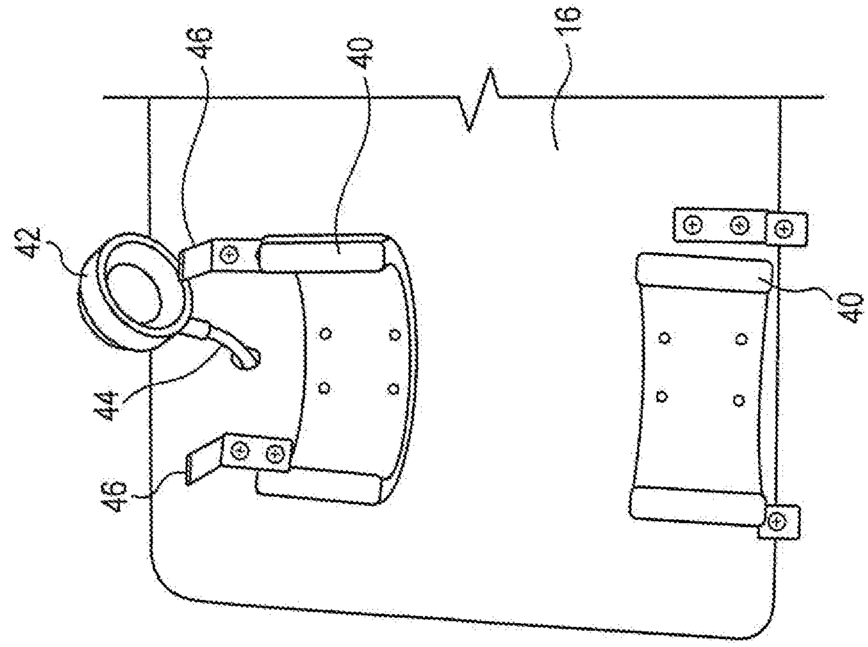
FIGS. 5 and 6 illustrate the interior of a start module, with and without a starting fuel tank, respectively, of a flexible fuel generator.

The generator may optionally include a start module. The start module includes a starting fuel tank holder and starting fuel line, for fluidly connecting a starting fuel tank to the air intake path (either the primary air intake path or the carburetor bypass air intake path, or common portions of the two air intake paths). Preferably, the start module includes: a starting fuel tank containing low-boiling point low-flashpoint fuel, preferably pressurized, such as a spray can of pressurized diethyl ether commonly available, as starting fluid; a starting fuel dispenser, for dispensing the low-boiling point low-flashpoint fuel, such as a spray cap or small mechanical liquid pump; a starting fuel enclosure, having a starting fuel button access for accessing the starting fuel dispenser, a starting fuel button cover to prevent accidental dispensing of the low-boiling point low-flashpoint fuel, enclosure bolt hales for attaching the starting fuel enclosure over the starting fuel tank. When present, the enclosure may be attached to the maintenance panel by bolts. Preferably, the starting fuel tank holder is attached to the generator housing, such as onto the maintenance panel. The starting fuel tank holder may be clips (as illustrated in FIG. 6), an adhesive strip or a strap.

Preferably, the generator includes an air filter along the air intake path (either the primary air intake path and/or the carburetor bypass air intake path, or common portions of the two air intake paths). When a starting fuel module is present, a starting fuel line is also present, which may be a simple plastic tube resistant to damage or chemical reaction from the low-boiling point low-flashpoint fuel, and preferably delivers the low-boiling point low-flashpoint fuel as a mist to the air exit side (back) of an air filter, or to some other point between an air filter and the cylinder.

The low-boiling point low-flashpoint fuel is preferably diethyl ether, such as starting fluid. Preferably, the low-boiling point low-flashpoint fuel is present in a starting fuel tank, more preferably as a pressurized fluid. Diethyl ether, particularly in the form of starting fluid is especially preferred (for example, VALVOLINE® Extra Strength Starting Fluid with cylinder lubricant), because it is conveniently supplied in pressurized cans of a convenient size; a simple press of the can top for a few seconds will dispense the desired amount of starting fluid mist. Gasoline may also be used, but it is less preferred because the composition and flash point are variable.

An amount of 0.1 to 10.0 grams, more preferably 0.3 to 3.0 grams, including 1.0, 1.5, 2.0 and 2.5 grams, of the low-boiling point low-flashpoint fuel is sufficient to start the engine and sustain combustion of a heavy fuel. Because the low-boiling point low-flashpoint fuel is provided along an air intake path it will enter the engine as a vapor. The engine will start and run on a combination of any liquid fuel from the primary fuel tank and fuel vapor from an air intake path. As the low-boiling point low-flashpoint fuel evaporates, it will allow the generator to rapidly transition automatically to solely the liquid fuel from the primary fuel tank, Any heavy fuel, gasoline, or alcohol and mixtures may be used as the liquid fuel from the primary fuel tank. In a variation, the fuel is diesel fuel. Preferably, the heavy fuel is JP-6. It may be desirable to adjust the size of the jet in the generator to compensate for the viscosity of the liquid fuel and the anticipated temperature of the liquid fuel in the primary fuel tank. It may be desirable to retard the spark plug ignition timing, as compared to a gasoline engine, because of the faster flame speed of heavy fuel. The primary fuel tank is fluidly connected to the engine, and delivers liquid fuel to the carburetor.

An optional thermal controller adjusts the flow of the coolant through the generator. Preferably, the coolant is air. For example, an air fan may pull air through the generator and over the outside of the cylinder, to cool the cylinder, and then out a cooling air outlet. In this configuration, the thermal controller may be a movable sheet of metal or plastic (a thermal door) which can interrupt the amount of the flow of air, at any point along the cooling air path. The thermal controller may be moved to increase or decrease the size of the cooling air outlet. In an alternative configuration, baffles may be use to increase or decrease the size of the cooling air outlet or inlet, or along the cooling air path. In another alternative configuration, the thermal controller may be a fan or pump coupled to a temperature sensor or thermostat, which increases or decreases the coolant flow to maintain the temperature within the desired temperature range, Optionally, a thermal controller, such as a thermal door, is used to maintain the temperature of the cylinder at 120-180° C., preferably 130-175° C. more preferably 150-170° C., for example 155-165° C. If the temperature is too low, or too high, the thermal controller can be used to increase or decrease the flow of coolant. The temperature of the generator is preferably the temperature of the cylinder, which may be conveniently measured at the spark plug using a thermocouple temperature sensor (for example, a spark plug temperature sensor available from TRAIL TECH).

Optionally, the generator may have full cylinder cooling. In a generator with full cylinder cooling, the isothermal operation of the engine may be maintained. Preferably, the cylinder comprises aluminum (that is, the engine block comprises aluminum), which keeps the generator low in weight, and because of the high thermal conductivity of aluminum, maintains isothermal operation of the engine. Preferably, full cylinder cooling comprises cooling the cylinder at the fuel entrance and/or at the exhaust exit. Full cylinder cooling may be achieved in larger generators (and larger simple engines) by using a heat conductive gasket spacer, such as a ⅜ inch brass gasket spacer. Such a gasket spacer is particularly useful to provide full cylinder cooling in a YAMAHA inverter EF2000iSH, as well as the HONDA EU2000i and EB2000i, and similar 5 kW devices.

Determining if an engine is operating in the isothermal range of 120-180° C. and has full cylinder cooling, may be carried out, as follows. The temperature of the engine is measured at the spark plug where it is screwed into the engine block, for example by a thermocouple attached to a washer. The engine is then operated on JP-8 fuel. If the engine does not knock over a period of at least 5 minutes, and the temperature of the engine is maintained at 120-180° C. during that period, then during that time period the engine is operating isothermally at 120-180° C. Furthermore, such operation over the 5 minute period confirms that the engine has full cylinder cooling. In the case of an engine with multiple cylinders, if the temperature at each spark plug is maintained at 120-180° C. during the 5 minute period, and knocking does not occur, then during that time period the engine is operating isothermally at 120-180° C.; furthermore, such operation, over the 5 minute period confirms that the engine has full cylinder cooling. An example of full cylinder cooling is the YAMAHA Inverter EF1000iS, which allows air to cool the cylinder at the fuel entrance and/or at the exhaust exit.

Preferably, the cylinder has a compression ratio greater than 8.0:1, for example 8.1:1 to 12:1 or 10:1, including 8.2:1, 8.3:1, 8.4:1, 8.5:1, 8.6:1, 8.7:1, 8.8:1, 8.9:1, 9.0:1 and 9.51. Preferably, the engine is air-cooled, has an aluminum block and uses fixed timing. Preferably, the engine is a 4 cycle, 50 cc engine.

A flexible fuel generator may be prepared by modifying a portable gasoline generator as described in International Application Publication No. WO 2013/103542, such as a YAMAHA Inverter EF1000iS, which is air-cooled, has an aluminum block, uses fixed timing, and is a 4 cycle, 50 cc engine, having a compression ratio of 8.2:1. The figures illustrate such a flexible fuel generator which includes a carburetor bypass air intake path. As illustrated, a start module is added, which deliver the low-boiling point low-flashpoint fuel, such as diethyl ether, to the back of the air filter. A thermal controller is added to the rear of the generator. A temperature display is added, which displays the temperature at the spark plug. The fixed spark plug ignition timing is retarded, by moving the spark ignition coil clockwise from its original position. A carburetor bypass is added, to provide a carburetor bypass air intake path. When a starting fuel tank with starting fuel dispenser is also present, and a heavy fuel such as JP-8 fuel is present in the primary fuel tank, the generator may be started by first depressing the dispenser for 1 to 3 second. The pull start is then used to start the generator, with the thermal door blocking most of the cooling air outlet. Once the temperature at the temperature display reaches 120-180° C., the thermal door may be adjust to maintain that temperature. The design of the generator does not require modification for isothermal operation, as the generator has full cylinder cooling. A single can of VALVOLINE® Extra Strength Starting Fluid with cylinder lubricant contains sufficient diethyl ether to start the generator about 100 times. It may be desirable to use higher quality oil that resists thermal breakdown, such as AMSOIL® SAE 10W-40 synthetic motor oil as the lubricant, or change the lubricant more often, due to the high; temperature operation of the engine. In addition it may be desirable to perform an engine flush treatment to remove carbon deposits from the heavy fuels.

In the case of such a modified portable gasoline generator, which has, also been modified to receive a gaseous low-flashpoint fuel directly into the carburetor using a step-down regulator, it is possible to start the generator using only the gaseous low-flashpoint fuel. Once the temperature of 120-180° C. is reached, it is possible to switch the fuel supply to a heavy fuel, such as diesel fuel, from the primary fuel tank, which is using the gaseous low-flashpoint fuel as the starting fuel and using, the heavy fuel as the running fuel. However, a much larger amount of gaseous low-flashpoint fuel is needed as compared to, low-boiling point low-flashpoint fuel to sustain combustion, and the switch-over to the primary fuel tank must be carried out by the user.

Examples of flexible fuel generators including a simple engine having a carburetor bypass air intake path of the present application are illustrated in the figures.

Figure 2:
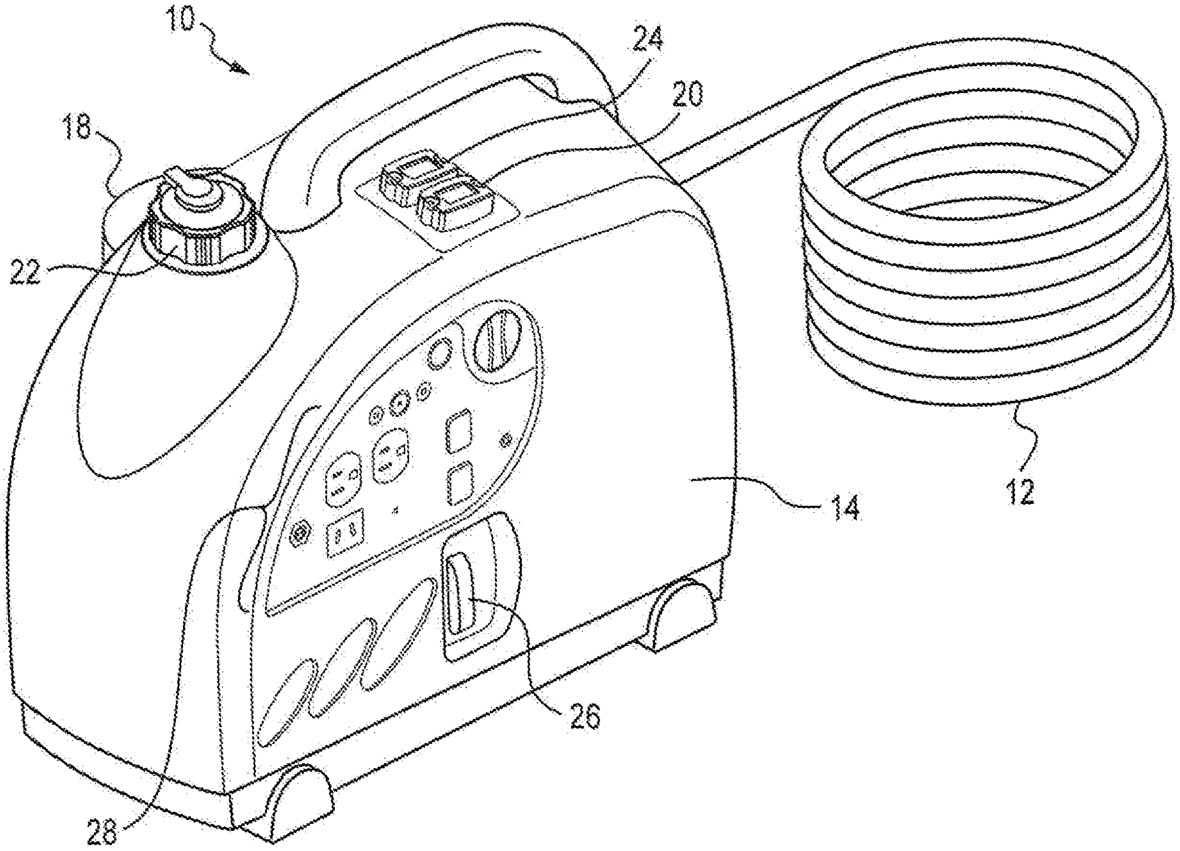

FIGS. 1 and 2 illustrate a flexible fuel generator, 10 having a carburetor bypass. The generator includes a generator housing, 14, which encloses the generator engine (not shown). Exhaust from the generator engine exits through an exhaust outlet (not shown) and then through an exhaust hose, 12, attached to the exhaust outlet. The generator housing includes a maintenance panel, 16, and a fueling port, 22, Attached to the maintenance door is a start module, 18. A temperature display, 20, on the generator housing displays the internal temperature of the generator engine. An auxiliary display, 24, displays other information, such as the length of time the generator has been operating. A pull start, 26, for manually starting the engine, passes through the generator housing. A control panel, 28, is present on the generator housing, and includes electrical plug receivers, start and stop buttons, and other controls for controlling the operation of the generator. Also illustrated is the handle (110 in the open position and 116 in the dosed position) of a valve (108, not illustrated) located outside the housing. An opening with an, air filter 118 provides air directly to an inlet tube (112, not illustrated).

Figure 4:
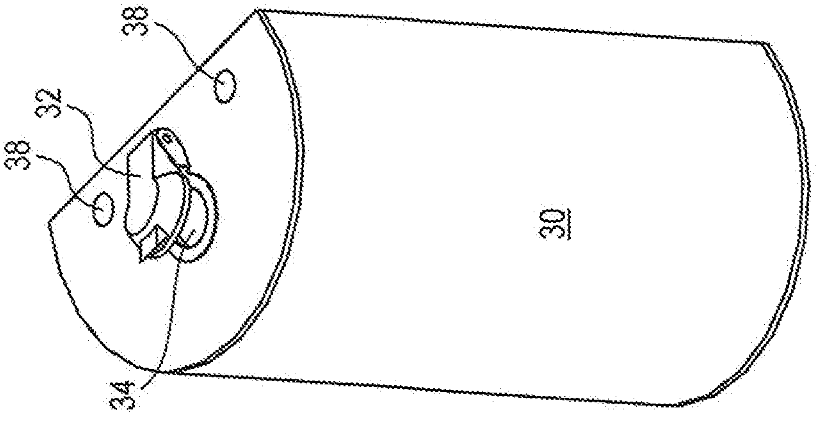
FIG. 4 illustrates starting fuel enclosure of a flexible fuel generator.
Figure 3:
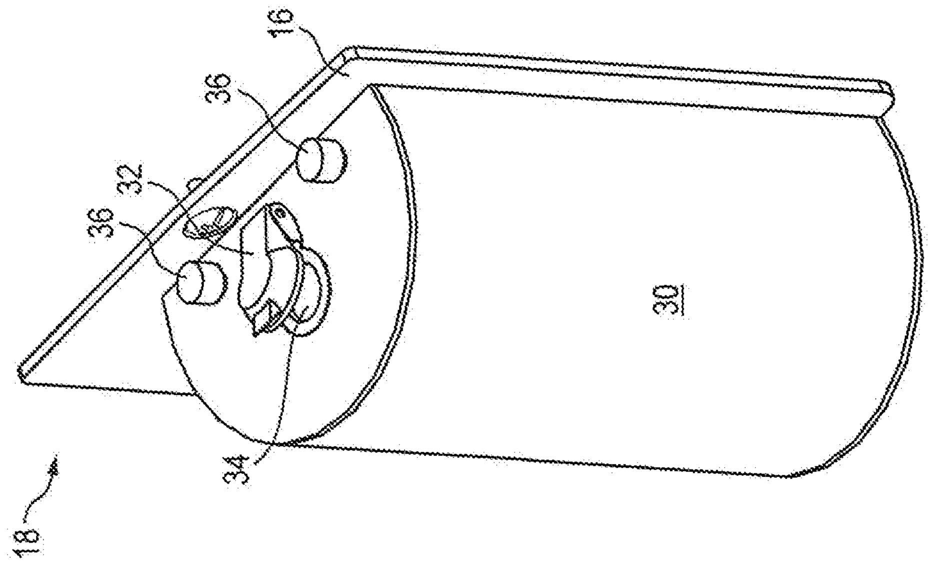
FIG. 3 illustrates a start module of a flexible fuel generator.

FIG. 3 illustrates a start module, 18. The start module is attached to the maintenance panel, 16. The start module includes a starting fuel enclosure, 30, which has a starting fuel button cover, 32, and a starting fuel button access, 34. Also illustrated are enclosure bolts, 36 and 36, which are used to attach the starting fuel enclosure to the maintenance panel. FIG. 4 illustrates starting fuel enclosure, 30. The starting fuel enclosure, 30, has a starting fuel button cover, 32, and a starting fuel button access, 34. Also illustrated are enclosure bolt holes, 38 and 38, for the enclosure bolts.

Figure 5:
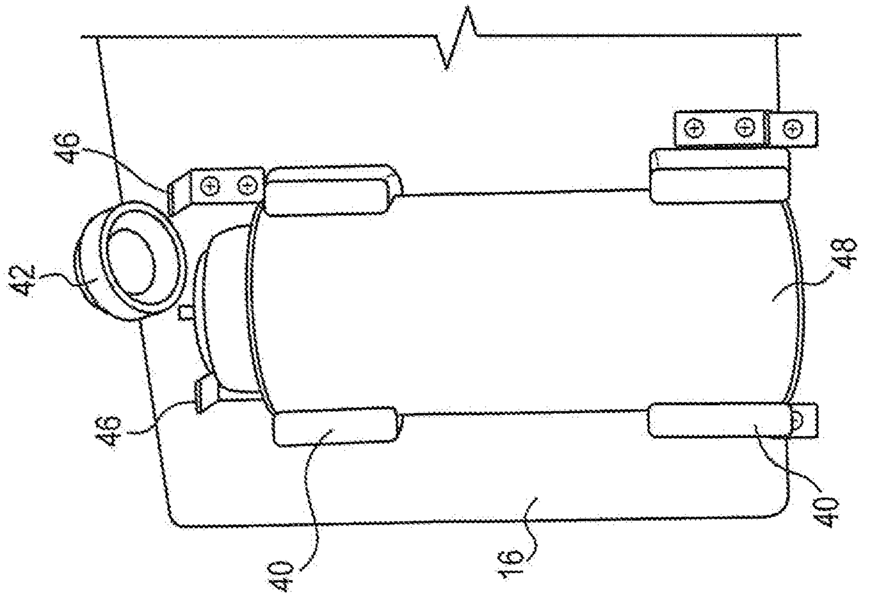

FIGS. 5 and 6 illustrate a start module with the starting fuel enclosure removed, with and without a starting fuel tank, respectively. Shown is the maintenance panel, 16. Attached to the panel are starting fuel tank holders, 40 and 40, for holding a starting fuel tank, 48. A starting fuel dispenser, 42, may be attached to the starting fuel tank, to dispense starting fuel. A starting fuel line, 44, attached to the starting fuel dispenser and passing through the maintenance panel, transports starting fuel to the air intake path of the generator. Also shown are enclosure bolt tabs, 46 and 46, attached to the maintenance panel, for receiving the enclosure bolts for attaching the starting fuel enclosure to the maintenance panel of the generator housing.

Figure 8:
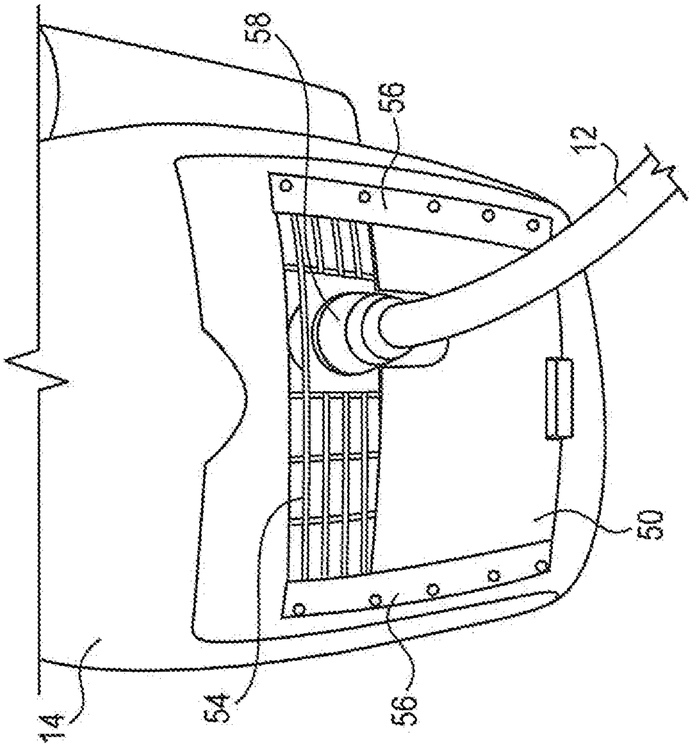
FIGS. 7 and 8 illustrate two configuration of the rear of a flexible fuel generator, providing details of the thermal controller of a flexible fuel generator.
Figure 7:
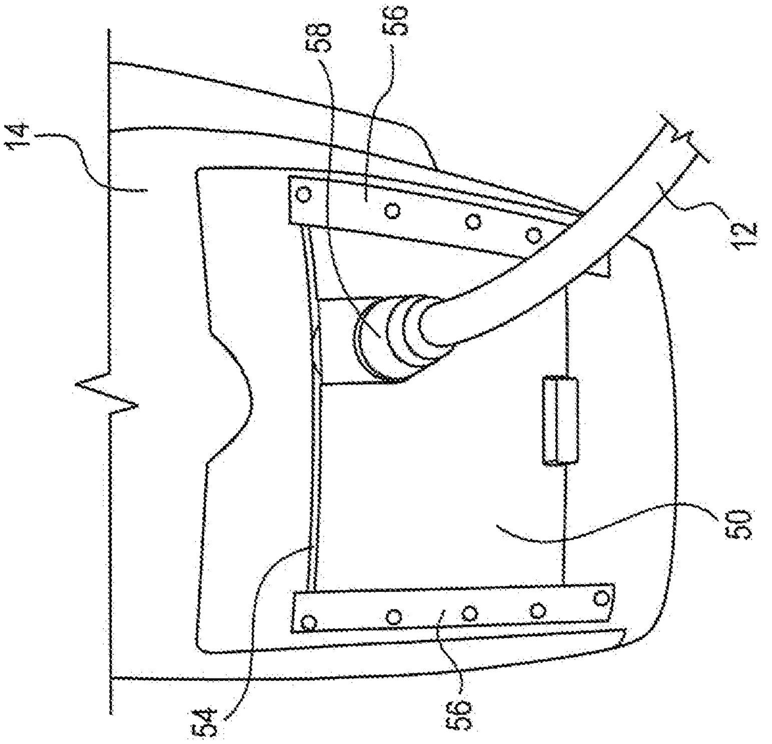

FIGS. 7 and 8 illustrate two configuration of the rear of a flexible fuel generator, providing details of the thermal door. Shown in these figures are the generator housing, 14, the exhaust port, 58, to which is attached the exhaust hose, 12. The thermal door, 50, is slideably attached to the rear of the generator housing by clasps, 56 and 56, over the cooling air outlet, 54. In FIG. 7, the thermal door almost completely blocks the cooling air outlet, while in FIG. 8, the thermal door blocks only a small portion of the cooling air outlet.

Figure 9:
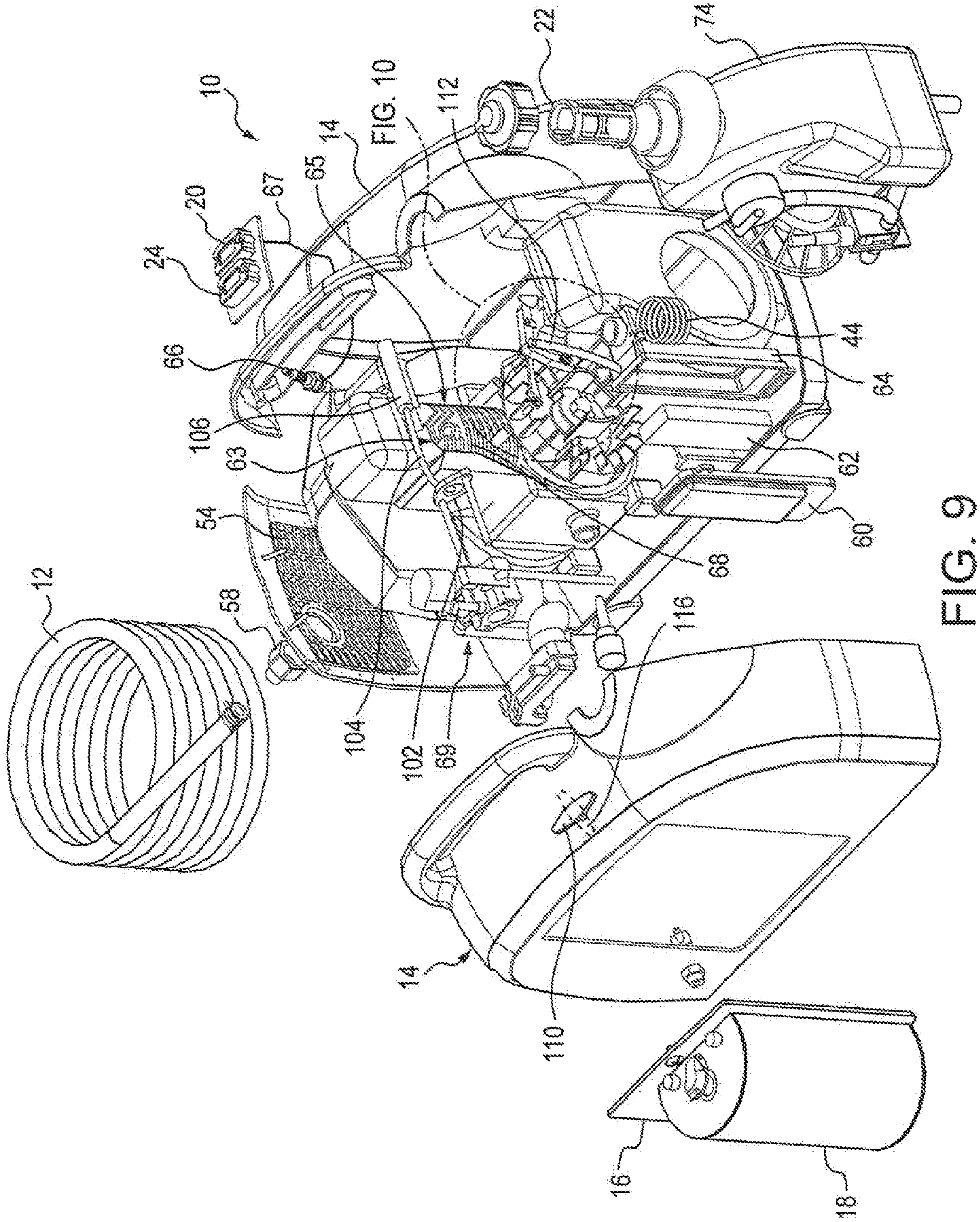
FIG. 9 is an exploded view of a flexible fuel generator having a simple engine including carburetor bypass air intake path.

FIG. 9 is an exploded view of a flexible fuel generator 10, having a carburetor bypass. Here, the generator housing, 14 has been split apart to show otherwise hidden elements. Unlike the flexible fuel generator illustrated in FIG. 1, the carburetor bypass air intake path draws air from behind the air filter, 62. The air filter housing includes a front panel, 60 and a rear panel, 64, and the air filter, 62, is between these two panels; these elements are part of the air intake path (both the carburetor bypass air intake path and the primary air intake path). Air enters the generator and is pulled through a lower portion of the rear panel to a lower portion of the front panel, and then up along the front panel and through the air filter, and finally out the back of the upper portion of the rear panel for the primary air intake path, or into the inlet tube, 112, of the carburetor bypass. As illustrated in this figure, the carburetor bypass is separated into the constituent parts for clarity of the relationship of the constituent parts with other parts of the engine. The carburetor bypass air intake path includes the inlet tube, 112, and follows into the valve, 108 (with only the handle (110 in the open position, and 116 in the closed position) of the valve being shown in this figure), and then into the first tube, 106, and a second tube, 104, and finally into the gasket spacer, 102. Also shown in the figure is starting fuel line, 44, which has an exit end delivering starting fuel to the back of the air filter (that is, the side of the air filter facing the rear panel). Although not illustrated in FIG. 9, the entrance end of the, starting fuel line is attached to starting fuel dispenser, forming a fluid connection between the starting fuel tank and the air intake path. By activation of the starting fuel dispenser, for example by pressing the top of the starting fuel dispenser, starting fuel is dispensed onto the back of the air filter. Coolant (in this device, air) flows over the cylinder, 68, including portion of the cylinder at the fuel entrance, 63, and at the exhaust exit, 65. Also illustrated in FIG. 9 are the spark plug, 66, the temperature sensor, 67 (which measure the temperature at the spark plug, and is connected to the temperature display), the carburetor, 69 and the primary fuel tank, 74.

Figure 10:
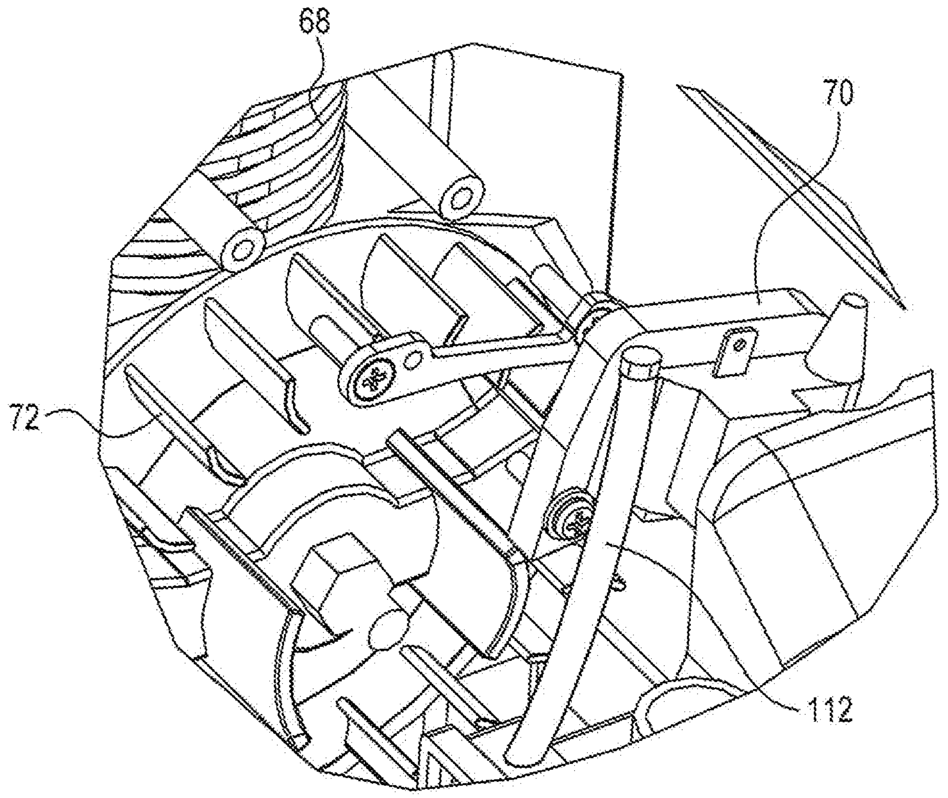
FIG. 10 illustrates a portion of the exploded view of the flexible fuel generator shown in FIG. 9.

FIG. 10 illustrates details of a portion of the exploded view of the flexible fuel generator shown in FIG. 9. Shown are the cylinder, 68, the air fan, 72, and the spark ignition coil, 70. The position of the spark ignition coil controls the timing of the spark plug, because it is coupled to movement of the drive shaft by magnets on the air fan (which is connected to the drive shaft); as the air fan rotates, the magnets actuate the spark ignition coil. Since the spark ignition coil is electrically connected to the spark plug, when the spark ignition coil is actuated, a spark is produced by the spark plug in the cylinder. Furthermore, the air fan, pulls air through the generator and over the outside of the cylinder, to cool the cylinder, and then out the cooling air outlet. As is more clearly illustrated in FIG. 9, the outside of the cylinder includes cooling fins along the full length of the exterior, so that the cylinder is cooled at both the top and the bottom and therefore has full cylinder cooling.

EXAMPLES

Example 1: Generator Having a Simple Engine Modified to a Flexible Fuel Generator Including a Carburetor Bypass Air Intake Path A YAMAHA Inverter EF1000iS was modified to include a carburetor bypass, a start module and thermal controller (a thermal door), as illustrated in the figures. Furthermore, a larger carburetor jet was used and the spark plug ignition timing was retarded.

Figure 12:
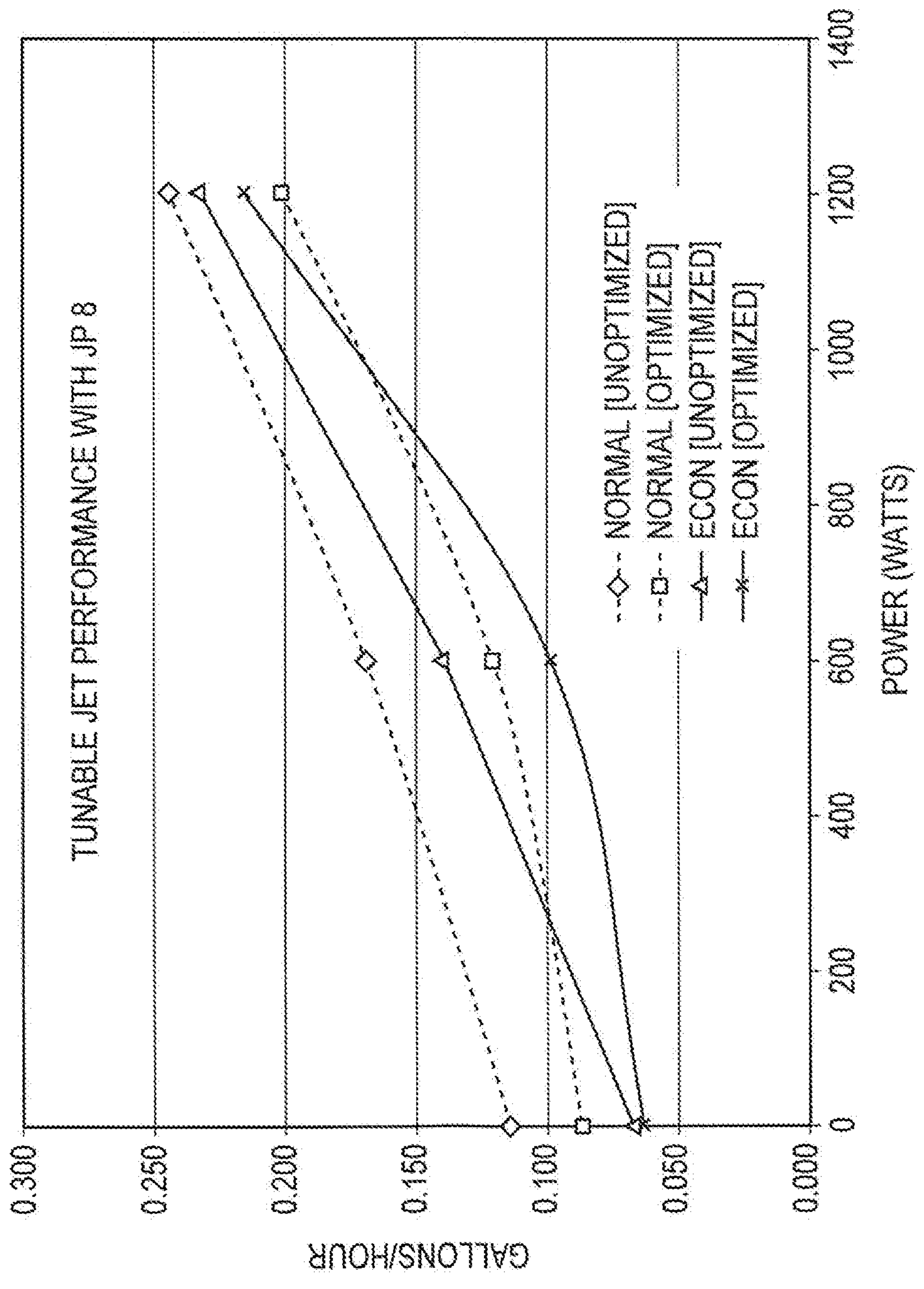
FIG. 12 is a graph of the fuel consumption of a 2 kW flexible fuel generator running on JP-8 fuel, in the normal and econ modes, without a carburetor bypass air intake path ("unoptimized") or with a carburetor bypass air intake path with the valve open to maximize efficiency ("optimized")

Example 2: Fuel Efficiency of 2 kW Flexible Fuel Generator Running on JP-8 Fuel FIG. 12 is a graph of the fuel consumption of a 2 kW flexible fuel generator running on JP-8 fuel, in the normal and econ modes, without a carburetor bypass air intake path ("unoptimized") or with a carburetor bypass air intake path with the valve opened to maximize efficiency ("optimized").

Figure 13:
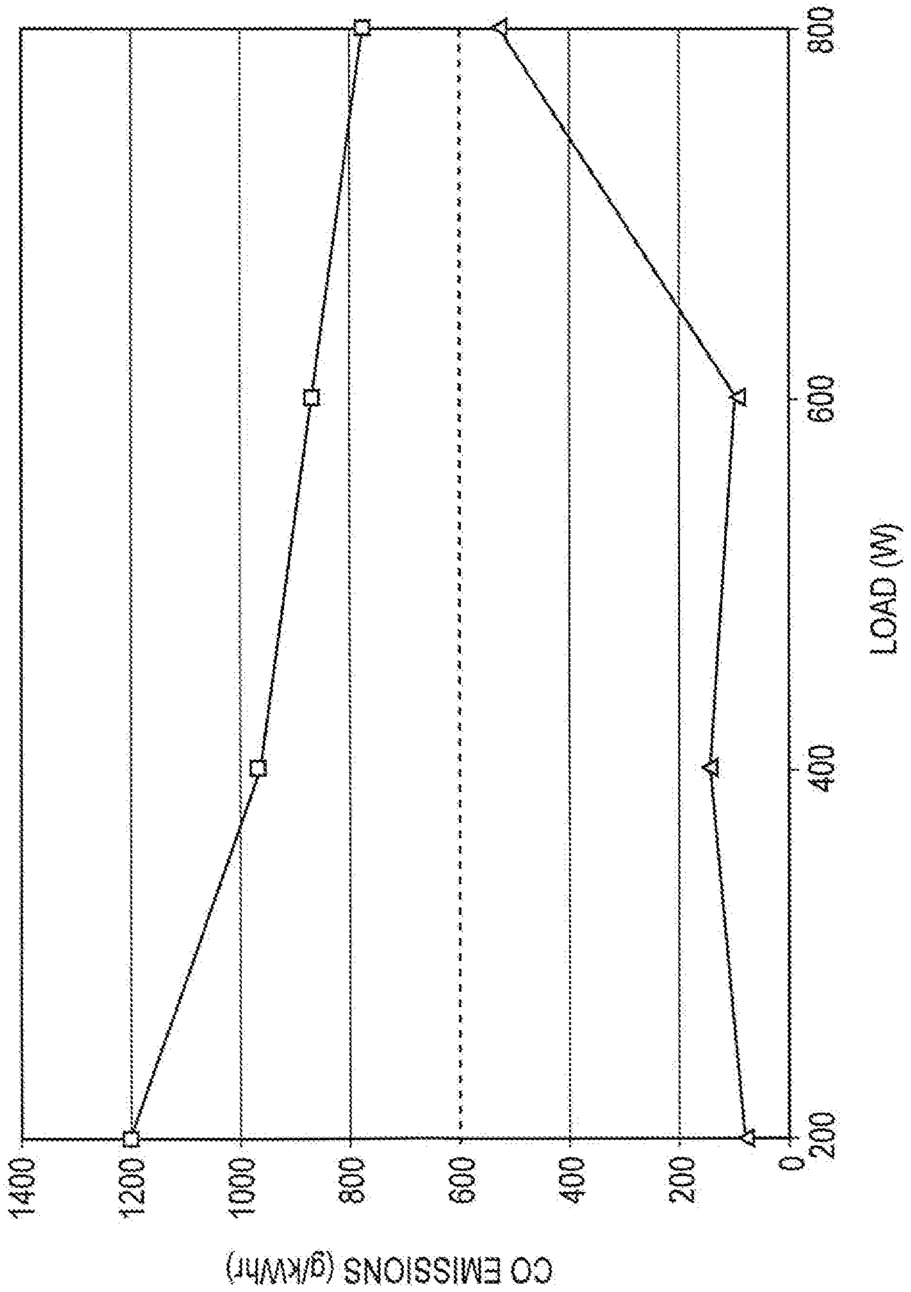
FIG. 13 is a graph of CO emissions for a 1 kW flexible fuel generator running on. JP-8 fuel, with a fixed jet without a carburetor bypass air intake path (squares), or with a carburetor bypass air intake path (triangles), with the valve opened to maximize efficiency. The dotted line represents the U.S. EPA limit for a 50 cc engine.

Example 3: Combustion Efficiency and CO Emissions of a 1 kW Flexible Fuel Generator FIG. 13 is a graph of CO emissions for a 1 kW flexible fuel generator running on JP-8 fuel with a fixed jet without a carburetor bypass air intake path (squares), or with a carburetor bypass air intake path (triangles), with the valve opened to maximize efficiency. The dotted line represents the U.S. EPA limit for a 50 cc engine.

Figure 14:
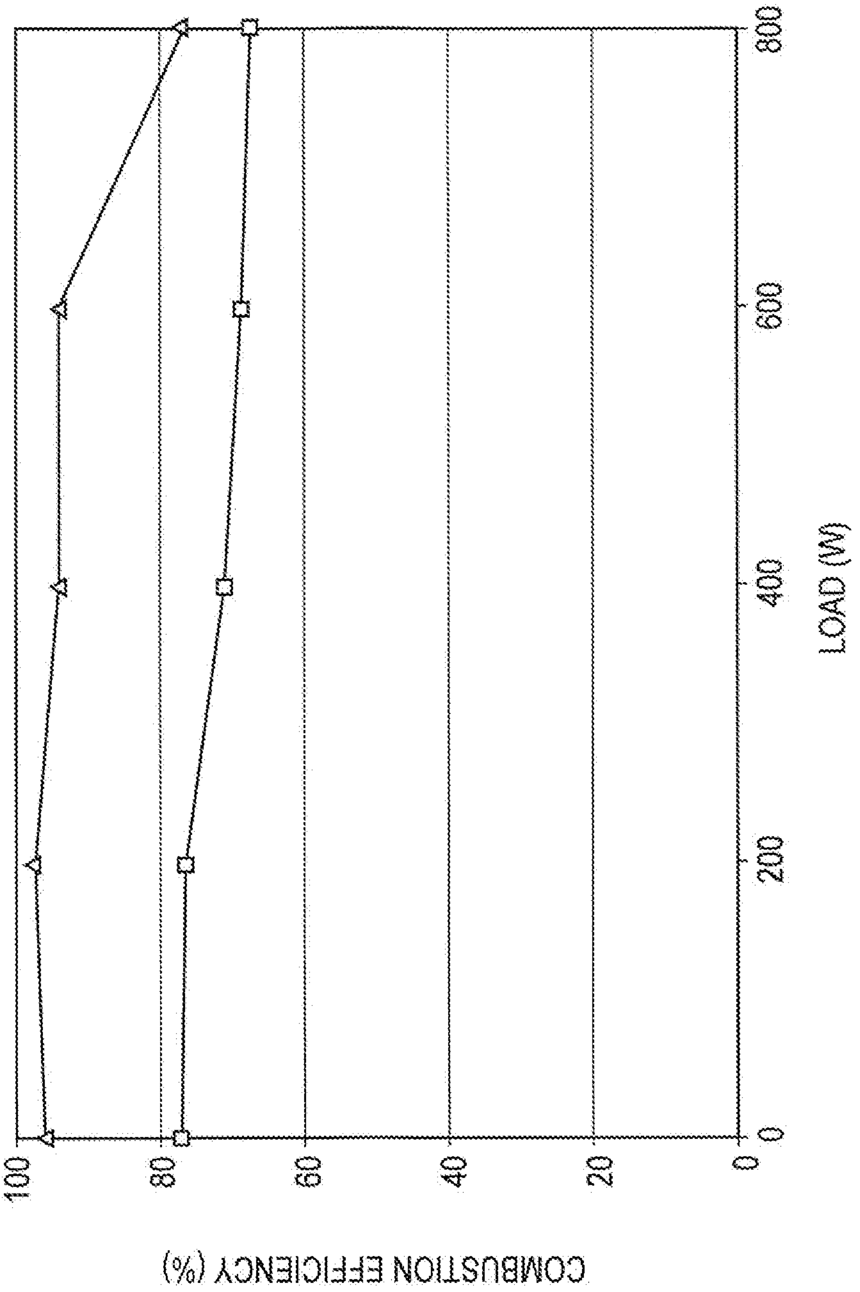
FIG. 14 is a graph of combustion efficiency for a 1 kW flexible fuel generator running on JP-8 fuel with a fixed jet without a carburetor bypass air intake path (squares), or with a carburetor bypass air intake path (triangles), with the valve opened to maximize efficiency.

FIG. 14 is a graph of combustion efficiency for a 1 kW flexible fuel generator running on JP-8 fuel with a fixed jet without a carburetor bypass air intake path (squares), or with a carburetor bypass air intake path (triangles), with the valve opened to maximize efficiency.

What is claimed is:

1. A simple engine, comprising:

(1) a cylinder, and a spark plug in the cylinder, (2) a carburetor, fluidly connected to the cylinder, (3) a primary air intake path, fluidly connecting atmosphere to the carburetor, (4) a carburetor bypass air intake path, fluidly connecting air to the cylinder without passing through the carburetor, and (5) a valve, along the carburetor bypass air intake path, for controlling the flow of air through only the carburetor bypass air intake path, wherein the engine further comprises a gasket spacer, between the carburetor and the cylinder, and the carburetor bypass air intake path feeds air into the gasket spacer.

2. The simple engine of claim 1, wherein the engine further comprises an air filter, and the carburetor bypass air intake path draws air through the air filter.

3. The simple engine of claim 1, wherein the engine further comprises an air filter, and both the primary air intake path, and the carburetor bypass air intake path, draw air through the air filter.

4. A flexible fuel generator, comprising the simple engine of claim 3.

5. The flexible fuel generator of claim 4, further comprising:

(6) a primary fuel tank, fluidly connected to the carburetor, (7) a coolant path, which provide a flow path for coolant to cool the cylinder, (8) a thermal controller, along the coolant path, and (9) a start module, comprising a starting fuel tank holder and a starting fuel line, wherein the starting fuel line is fluidly connected to the primary air intake path or the carburetor bypass air intake path.

6. The flexible fuel generator of claim 5, wherein the generator is air-cooled.

7. The flexible fuel generator of claim 5, wherein the cylinder comprises aluminum.

8. The flexible fuel generator of claim 5, further comprising a generator housing enclosing the cylinder, wherein the start module is attached to the generator housing.

9. The flexible fuel generator of claim 5, further comprising a starting fuel tank, fluidly connected to the starting fuel line.

10. The flexible fuel generator of claim 5, further comprising a generator housing enclosing the cylinder, wherein the start module is attached to the generator housing, and wherein the generator is air-cooled, the cylinder comprises aluminum, the generator does not include a battery, the start module further comprises a starting fuel enclosure, the starting fuel line is connected to an air intake path between the air filter and the cylinder, the coolant path has an entrance for air to enter the generator and an exit for air to exit the generator, the thermal controller is a thermal door, and the thermal door is at the exit of the coolant path.

11. The simple engine of claim 1, wherein the gasket spacer comprises a metal.

12. The simple engine of claim 1, wherein the gasket spacer comprises brass.

13. A generator, comprising the simple engine of claim 1.

14. The generator of claim 13, wherein the generator is a 1 kW, 2 KW or 5 kW generator.

15. The simple engine of claim 1, wherein the simple engine is part of a lawn mower; a leaf blower; a motor cycle without a fuel injector; a moped; an ATV; or a dirt bike.

* * * * *